H. B. WALLACE.
MANDREL.
APPLICATION FILED NOV. 9, 1916.

1,227,509.

Patented May 22, 1917.
2 SHEETS—SHEET 1.

Inventor:
Harry B. Wallace,
By Hugh K. Wagner,
Atty.

H. B. WALLACE.
MANDREL.
APPLICATION FILED NOV. 9, 1916.

1,227,509.

Patented May 22, 1917.
2 SHEETS—SHEET 2.

Inventor:
Harry B. Wallace,
By Hugh K. Wagner
Atty.

UNITED STATES PATENT OFFICE.

HARRY B. WALLACE, OF ST. LOUIS, MISSOURI.

MANDREL.

1,227,509. Specification of Letters Patent. Patented May 22, 1917.

Application filed November 9, 1916. Serial No. 130,443.

*To all whom it may concern:*

Be it known that I, HARRY B. WALLACE, a citizen of the United States, residing at the city of St. Louis, in the State of Missouri, have invented certain new and useful Improvements in Mandrels, of which the following is a specification.

This is a continuation in part of an application filed by me August 18, 1916, Serially Numbered 115,638.

This invention relates to mandrels especially adapted for forming articles circumferentially endless and seamless in cross section.

While this mandrel may be used for various useful purposes and for the making of various articles, it has nevertheless been designed, and in the drawings is illustrated, as preferably applied in the making of inner tubes or outer casings or combined tubes and casings for the purpose of automobile tires; but its use is not limited thereto.

In the drawings forming part of this specification and in which like numbers of reference denote like parts wherever they occur—

Figure 1:
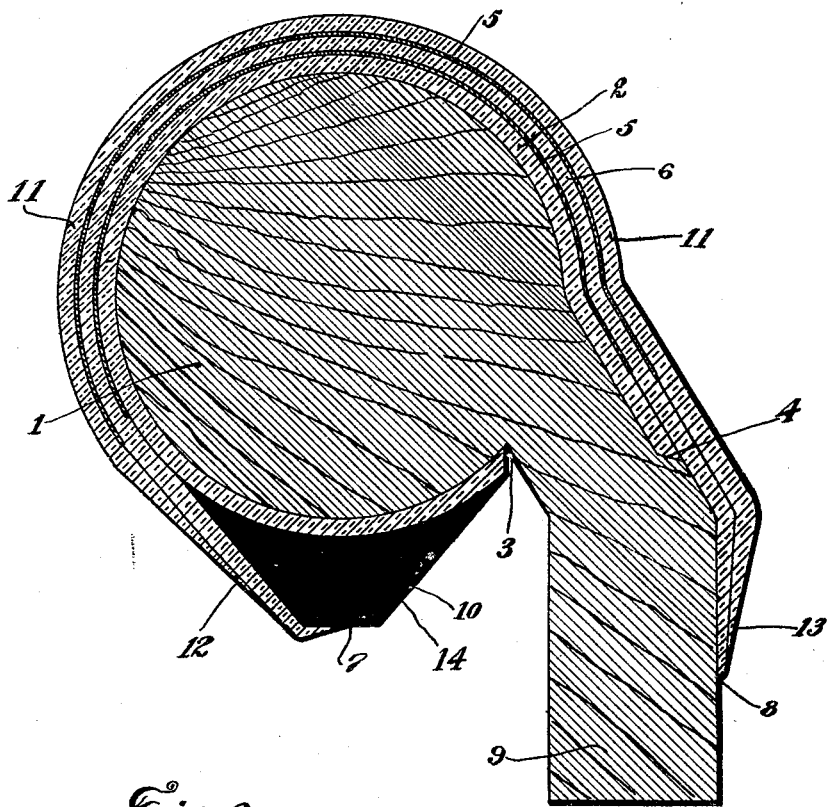
Figure 1 is a cross-sectional view through the mandrel, showing placed thereon certain plies of rubber and textile fabric and other parts of an automobile tube or tire.
Figure 2:
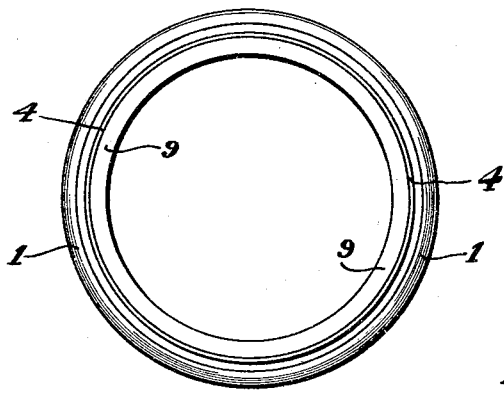
Fig. 2 is a side elevational view (looking from the right of Fig. 1) with the said tire parts omitted.

The general form of this mandrel is annular, though provided with a flange or projection from the side thereof.

Heretofore inner tubes for tires have been formed in longitudinal tubular form on long metal calender rolls or mandrels and thus cured and later bent into annular form and joined at their ends by a transverse seam and the said transverse seam vulcanized. The said transverse seam has been a point of weakness and a place where leaks resulting in flat tires have often occurred. The said calender rolls bearing the inner tubes during the said curing are out of use for shaping purposes during the process of curing, being used in curing as internal molds. In lieu of the said rolls, air or other fluid under pressure is used in the process of this invention as a form during curing.

The mandrel of this invention may be made of wood, because, according to the herein-described process of molding and curing, it is not necessary to introduce the said cores into the curing oven, but one of the advantages of this invention is that it provides for the removal of the molded tube from the molding core before introduction into the curing oven. Metal cores are, moreover, more expensive than those made of wood or similar material. The cores illustrated and described herein may be collapsible, if desired, but need not necessarily be so, and they may be made not alone of wood but of any desirable material.

Certain other features of the construction of this invention will be best understood when stated in the following description of the method of manufacture of these tires.

The core or tire mold 1 is first placed in position on a tire mold holder of ordinary construction, which holder is not illustrated in the drawings. Then upon and around the said core 1 annularly and nearly circumferentially a layer 2 of plastic rubber is laid and worked upon the core 1 from the notch 3 all the way around to the shoulder 4. Then at and to each side of the tread part of the tire a layer 5 of fabric is worked upon the said layer of rubber 2 so as to adhere thereto. After this a second ply of plastic rubber 6 is laid upon said fabric ply 5 and worked thereon and from a point located approximately at the point marked 7 all the way around to approximately the point marked 8 upon the flange 9 of core 1, the relatively hard rubber or semi-hard rubber or built-up fabric bead or ring 10 having previously been placed within the core 1 and closely fitting and adhering more or less to the plastic rubber material 2. Following the placing and working of plastic rubber material 6, another ply of fabric 5 is placed thereon and worked thereupon like the fabric layer last mentioned, and then the outer ply of plastic rubber 11 is laid in place and worked upon the ply of fabric 5 underlying the same, being chamfered or tapered near its ends 12 and 13 so as to end in smooth connection with and adhesion to ply 6. In the foregoing description, where rubber or fabric is said to be worked upon an underlying member, it is understood that the same is accomplished by suitable hand or other tools, such as rollers, knives, mallets, pestles, or the like.

After the inner tube has been constructed as hereinbefore described, it is slipped off the core 1 by loosening it at the point 8 (of course, if a collapsible core is used it is simply collapsed), and then that part of the same adjacent to the said point 8 when on the core is brought together with the opposing side, so that the part of the tire that when on the core lies adjacent to the shoulder 4 meets with that part of the tube which when on the core is located at the notch 3, and that part of the tube which when on the core extends from the shoulder 4 to the point marked 8 is caused to adhere to the outside of the ring 10, covering the same all the way from the part which on the core is adjacent to the notch 3 to the point marked 7. A hole (not shown) is formed in ring 10 through which the stem of the valve (not shown) is inserted, and the same protrudes outwardly through the ring 10 and that part of the plastic rubber tube material that extends when on the core from the shoulder 4 to the point marked 8. The said part of the tube, being of plastic rubber, is easily molded around the said valve.

While in the drawings the two outermost plies of rubber are shown as stopping before passing clear across the base of ring 10, one of the same being illustrated in Fig. 1 as reaching approximately to the middle of the said base, namely, to the point 7, and the other extending only to the point 12, nevertheless either or both of these plies may, if desired, be carried as far as the point 14 or to any other desired nearer or farther point, *mutatis mutandis*.

While the ring 10 has been herein mentioned as an element used together with other elements, such, for instance, as the plies of rubber or the plies of fabric or the valve, nevertheless it should be clearly understood that after vulcanization of the tire or tube the whole constitutes an integral mass in which the individual elements, such, for instance, as the said plies of rubber and the ring and the said plies of fabric and the said valve, are fused together and constitute a single unitary article. It should be also understood that, while, for purposes of convenience and in order to give an example of one form of this invention, the ring 10 has been described as being an element used while the tire or tube is in the making, nevertheless the same may be omitted entirely and the other building elements united and vulcanized into a unitary whole.

I hereby reserve the benefit of all changes in form, arrangement, order, or use of parts, as it is evident that many minor changes may be made therein without departing from the spirit of this invention.

Figure 3:
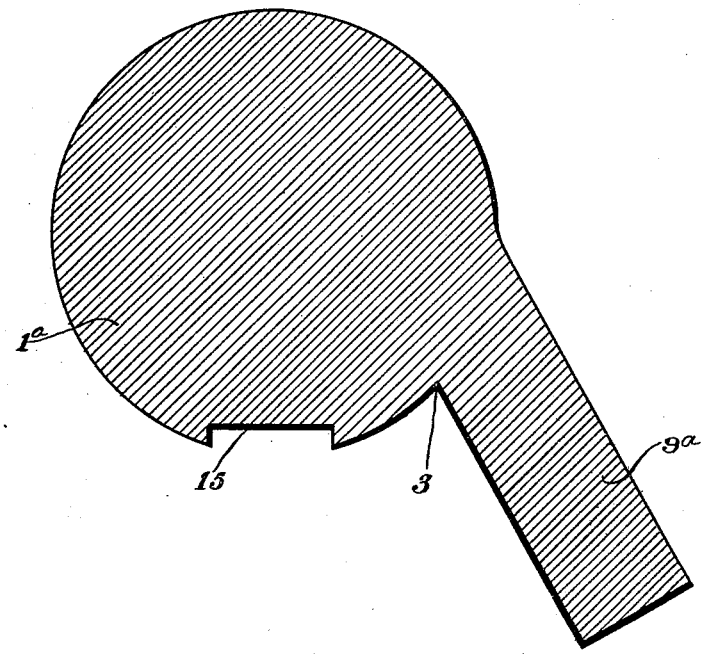
Fig. 3 is a sectional view through a modified form of mandrel on the line 3—3, Fig. 4.
Figure 4:
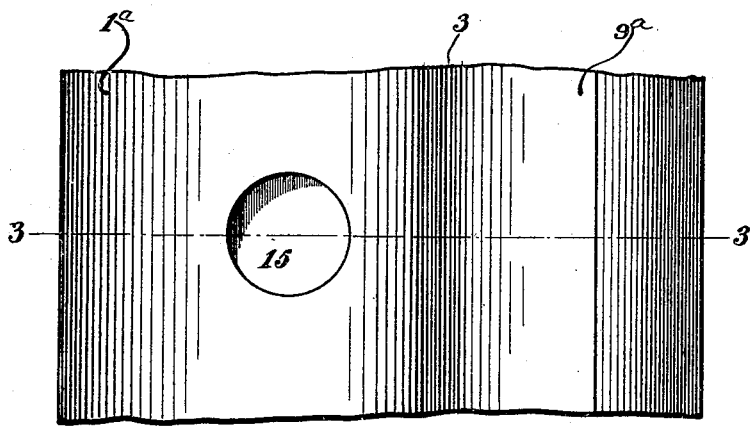
Fig. 4 is a fragmentary bottom plan view of the same.

The shoulder 4 may be omitted from the flange 9, and the form of the flange 9ª may be that shown in Fig. 3 or that shown in Fig. 1, or any other form or arrangement may be used. When the flange 9ª is as shown in Fig. 3, there may be, instead of the shoulder 4 to indicate a stop, simply a mark or series of marks indicating the point to which the material shall be brought over on that side, or the skill of the workman may be relied upon to bring the first ply and successive plies to a suitable uniform point on flange 9ª. Furthermore, the shoulder 4 need not be a continuous circle, but may be formed of a series of shoulders or in any other suitable shape. Likewise, the flange 9 may be non-continuous if desired.

The countersink 15 is provided in the internal periphery of the core 1ª to receive the head of the valve (not shown) that is to be embedded in the tube or tire as formed. The said valve is simply passed through the innermost plastic ply 2 and its head seated in the countersink 15, after which the plastic ply 2 is caused to fit in the notch 3 and to lie in more or less adhesive connection around the circumference of core 1ª, and the said ply 2 thus holds the head of the said valve in place in countersink 15, and, if ring 10 is used, is, as herein described, passed through a hole (not shown) therein, but, if ring 10 is not used, the other plies of material fit around the said valve. In any event, the valve is held in place with its head in the countersink 15 until the building of the tire or tube has been completed, whereupon the tire or tube is removed from the mandrel, carrying with it the valve already in place, and at one operation the tire or tube is cured and the valve vulcanized in its place in an air-tight manner.

I claim:

1. A mandrel for the formation of tires composed of a ring circular in cross-section except at the point of projection therefrom of an arm, the said arm projecting from the entire circumference of the said ring at one lateral face thereof and being adapted to serve as a holding and working surface for part of the said tire in making.

2. A mandrel for the formation of tires composed of a ring circular in cross-section except at the point of projection therefrom of an arm, the said arm projecting from the entire circumference of the said ring at one lateral face thereof and being adapted to serve as a holding and working surface for part of the said tire in making and being, furthermore, adapted to indicate a suitable stop for parts of the material used in making the said tire.

3. A mandrel for the formation of tires composed of a ring circular in cross-section except at the point of projection therefrom of an arm, the said arm projecting from the entire circumference of the said ring at one side thereof and being adapted to serve as a holding and working surface for part of the said tire in making, the said arm having a shoulder thereon to act as a stop for part of the material used in making the said tire.

4. A mandrel for the formation of tires composed of a ring circular in cross-section except at the point of projection therefrom of an arm, the said arm projecting from the entire circumference of the said ring at one side thereof and being adapted to serve as a holding and working surface for part of the said tire in making, the said arm having a plurality of shoulders to act as stops for the material used in making the said tire.

5. A mandrel for the formation of tires composed of a ring circular in cross-section except at the point of projection therefrom of an arm, the said arm projecting from substantially the entire circumference of the said ring at one lateral face thereof and being adapted to serve as a holding and working surface for part of the said tire in making, the said arm being of a conformation adapted to receive the material out of which part of the said tire is made, to allow the same to be worked thereon, to indicate the limit of its quantity, and to leave the same free for removal therefrom in order that the said tire may be vulcanized in the absence of the said mandrel.

6. A mandrel for the formation of tires or tubes composed of a ring having a flange projecting therefrom, the said flange being adapted to serve as a holding and working surface for part of the said tire or tube in making, and there being on the interior of the said ring a countersink for the reception of part of a valve to be united with the said tire or tube while the same is being formed on the said mandrel.

7. A mandrel for the formation of tires composed of a core having uninterrupted top, bottom, and one side wall and an arm projecting radially from the entire circumference of the other side wall and adapted to serve as a holding and working surface for part of the said tire in making.

8. A mandrel for the formation of tires composed of a ring circular in cross section having an arm projecting from one side of the said ring, there being a notch at the intersection of the inner circumference of the said ring and the said arm and the said arm being adapted to serve as a holding and working surface for part of the said tire in making.

9. A mandrel for the formation of tires composed of a ring circular in cross section having an arm projecting radially from the entire circumference of the said ring at one side thereof, whereby the tread and one side wall and the rim wall may be molded on the said ring and whereby the arm serves as a holding and working surface for part of the said tire in making.

In testimony whereof I hereunto affix my signature.

HARRY B. WALLACE.

Copies of this patent may be obtained for five cents each, by addressing the "Commissioner of Patents, Washington, D. C."